United States Patent
Lee et al.

(10) Patent No.: US 10,023,225 B2
(45) Date of Patent: Jul. 17, 2018

(54) APPARATUS AND METHOD FOR CONTROLLING MOTOR-DRIVEN POWER STEERING SYSTEM

(71) Applicants: Hyundai Motor Company, Seoul (KR); MANDO Corporation, Pyeongtaek, Gyeonggi-do (KR)

(72) Inventors: Kyung Bok Lee, Gyeonggi-do (KR); Nam Young Kim, Gyeonggi-do (KR); Tae Soo Chi, Gyeonggi-do (KR); Sang Hyuk Lee, Gyeonggi-do (KR); O Sung Kwon, Gyeonggi-do (KR); Duck Hwan Kim, Gyeonggi-do (KR); Seong Hoon Park, Gyeonggi-do (KR)

(73) Assignees: Hyundai Motor Company, Seoul (KR); MANDO Corporation, Pyeongtaek, Gyeonggi-do (KR)

( * ) Notice: Subject to any disclaimer, the term of this patent is extended or adjusted under 35 U.S.C. 154(b) by 120 days.

(21) Appl. No.: 15/275,674

(22) Filed: Sep. 26, 2016

(65) Prior Publication Data
US 2017/0158226 A1    Jun. 8, 2017

(30) Foreign Application Priority Data

Dec. 4, 2015    (KR) .................. 10-2015-0171998

(51) Int. Cl.
*B62D 5/04*    (2006.01)
*B62D 6/00*    (2006.01)
*B62D 6/10*    (2006.01)

(52) U.S. Cl.
CPC ......... *B62D 5/0463* (2013.01); *B62D 5/0481* (2013.01); *B62D 6/005* (2013.01);
(Continued)

(58) Field of Classification Search
CPC .... B62D 5/0463; B62D 5/0481; B62D 6/005; B62D 6/10; B62D 6/008; B62D 5/0472;
(Continued)

(56) References Cited

U.S. PATENT DOCUMENTS

| | | | |
|---|---|---|---|
| 6,863,150 B1 * | 3/2005 | Tanaka | B62D 5/0463 180/443 |
| 2007/0029129 A1 * | 2/2007 | Shiozawa | B62D 5/0472 180/446 |
| 2011/0264329 A1 * | 10/2011 | Limpibunterng | B62D 5/008 701/41 |

FOREIGN PATENT DOCUMENTS

| KR | 10-2014-0117166 A | 10/2014 |
|---|---|---|
| KR | 10-1539081 B1 | 7/2015 |

(Continued)

*Primary Examiner* — Behrang Badii
(74) *Attorney, Agent, or Firm* — Mintz Levin Cohn Ferris Glovsky and Popeo, P.C.; Peter F. Corless (57) ABSTRACT

An apparatus and a method for controlling a motor-driven power steering system can inhibit a change in steering feeling which may be caused by abrasion and degradation of components in the motor-driven power steering system, and maintain initial steering feeling. The method determines a torque compensation amount by comparing a reference value with change ratio average data of steering torque with respect to a steering angle, and compensates for driver input torque in accordance with the determined torque compensation amount, such that it is possible to effectively inhibit the change in steering feeling which may be caused by abrasion and degradation of components, and maintain the initial steering feeling.

17 Claims, 7 Drawing Sheets

(52) U.S. Cl.
CPC .................. *B62D 6/10* (2013.01); *B62D 5/04* (2013.01); *B62D 5/0472* (2013.01); *B62D 6/00* (2013.01); *B62D 6/008* (2013.01)

(58) Field of Classification Search
CPC .... B62D 5/0469; B62D 1/286; B62D 5/0466; B62D 15/025; B62D 6/002; B62D 6/003; B62D 5/008; B62D 6/007; B62D 6/04; B60W 10/10; B60W 10/20
See application file for complete search history.

(56) References Cited

FOREIGN PATENT DOCUMENTS

| | | |
|---|---|---|
| KR | 10-2015-0103255 A | 9/2015 |
| KR | 10-2015-0131783 A | 11/2015 |

\* cited by examiner

APPARATUS AND METHOD FOR CONTROLLING MOTOR-DRIVEN POWER STEERING SYSTEM

CROSS-REFERENCE TO RELATED APPLICATION

This application claims under 35 U.S.C. § 119(a) the benefit of Korean Patent Application No. 10-2015-0171998 filed on Dec. 4, 2015, the entire contents of which are incorporated herein by reference.

BACKGROUND (a) Technical Field

The present invention relates to an apparatus and a method for controlling a motor-driven power steering system, more particularly, to an apparatus and a method that are capable of inhibiting a change in steering feeling which may be caused by abrasion and degradation of components in the motor-driven power steering system, and maintaining initial steering feeling.

(b) Description of the Related Art

In general, known types of power assistance steering systems for reducing a steering effort of a driver include: a hydraulic power steering (HPS) system, which assists a steering effort of a driver by using hydraulic pressure produced by a hydraulic pump; and a motor-driven power steering (MDPS) system (hereinafter, referred to as 'MDPS'), which assists a steering effort of a driver by using driving torque of an electric motor.

In the case of the MDPS, output of the electric motor for steering assistance may be controlled in accordance with a traveling condition of a vehicle when a steering assistance function is carried out as the driver manipulates a steering wheel, thereby providing improved steering performance and steering feeling as compared to the hydraulic power steering system.

Therefore, the MDPS, which is capable of changing and controlling steering auxiliary power produced by motor output in accordance with the traveling condition, has been widely applied to vehicles that are recently released on the market.

The MDPS may include sensors such as a steering angle sensor which detects a steering angle (column input angle) according to manipulation of the steering wheel, a torque sensor which detects steering torque (steering wheel torque and column torque) inputted through the steering wheel, a vehicle speed sensor which detects a vehicle speed, a wheel speed sensor, an engine rotational speed sensor, a yaw rate sensor, a controller (MDPS ECU), and a steering motor (MDPS motor).

The controller receives, from the sensors, steering input information such as a steering angle, a steering angular velocity (an angular velocity value obtained from a signal differentiated from a steering angle signal), and steering torque, and vehicle state information (a vehicle speed, a wheel speed, an engine rotational speed, a yaw rate, etc.) in order to drive the steering motor and control output of the steering motor.

In this case, the controller controls driving power (motor output) of the steering motor in accordance with a vehicle speed so as to produce auxiliary torque adjusted for steering assistance, and the controller increases the motor output at a low speed so that the driver may manipulate a light steering wheel, and decreases the motor output at a high speed so that the driver may manipulate a heavy steering wheel, thereby ensuring traveling stability of the vehicle.

If the steering wheel is too light when the vehicle travels at a high speed, a dangerous situation may occur even by a slight manipulation of the steering wheel, and driving stability becomes poor. Therefore, by changing steering assistance characteristics in accordance with a vehicle speed so as to assist the driver so that the driver may manipulate a heavier steering wheel when the vehicle travels straight at a high speed, a stable steering wheel manipulation may be carried out.

Typically, the output of the steering motor, which assists a driver steering effort, is obtained as the controller controls a motor electric current to be applied to the steering motor (auxiliary control, electric current amount control).

In this case, the controller basically provides the steering motor with an electric current amount corresponding to an output value (steering system output torque, i.e., steering motor output torque) determined based on the steering input information and the vehicle state information after tuning and calculating the electric current amount, and the controller generates force for assisting a driver steering effort by driving the motor.

In the steering system, constituent elements for transmitting the driver steering effort applied through the steering wheel and steering auxiliary power generated in accordance with the steering effort, include: a steering column which is installed at a lower side of the steering wheel, a gearbox which converts rotational force being transmitted from the steering column into straight force and changes a direction of a tire, and a universal joint which transmits rotational force transmitted to the steering column to the gearbox.

Here, the gearbox includes a pinion gear which receives rotational force from the universal joint, and a rack bar which has a rack meshing with the pinion gear, and the rack bar is moved straight leftward and rightward by the rack when the pinion gear is rotated.

In this case, force, which is generated as the rack bar moves straight leftward and rightward, is transmitted to the tire via a tie rod and a ball joint, thereby changing a direction of the tire.

Meanwhile, mechanical abrasion or durability degradation of components of the motor-driven power steering system may occur as the components are used over a long period of time, such that output of the motor-driven power steering system may be changed.

If the output of the motor-driven power steering system is changed, there is a problem in that steering feeling felt by the driver varies, and therefore, there is a need for a method of compensating for output against abrasion or degradation of components.

Figure 1:
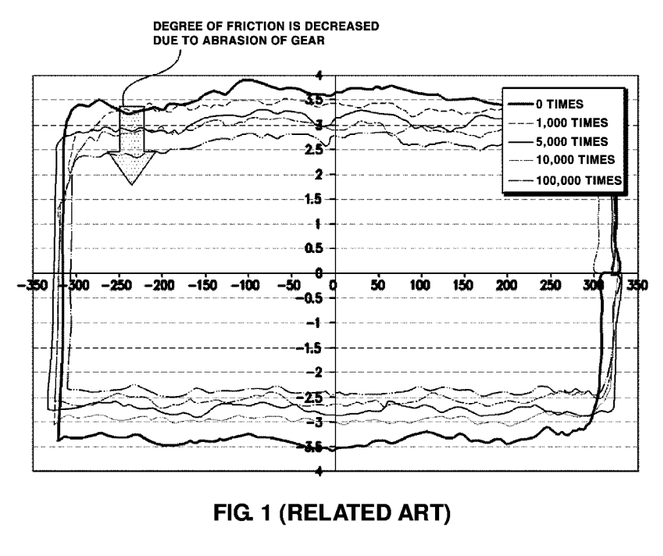
FIG. 1 (RELATED ART) is a graph illustrating that a degree of friction of a rack-and-pinion gear is decreased due to the occurrence of abrasion in a motor-driven power steering system.

FIG. 1 (RELATED ART) is a view for explaining a problem in the related art, and illustrates durability test data for a rack-and-pinion gear. The data shows degrees of friction of the rack-and-pinion gear with respect to cumulative values of the number of durability test steering, that is, the number of left/right full-turn steering of the steering wheel for a durability test when the steering wheel is repeatedly and fully turned leftward and rightward in a state in which vehicle wheels are stopped.

As illustrated in FIG. 1, it can be seen that as a cumulative value of the number of durability test steering is increased, a degree of friction of the rack-and-pinion gear is decreased because of the occurrence of abrasion.

Because of abrasion and durability degradation of components such as the steering motor or bushings in the steering system, which occur when the components have been used over a long period of time, in addition to abrasion of the rack-and-pinion gear, output of the steering system may be changed due to a reduction in friction between the components even under the same condition, which changes steering feeling felt by the driver.

Figure 2:
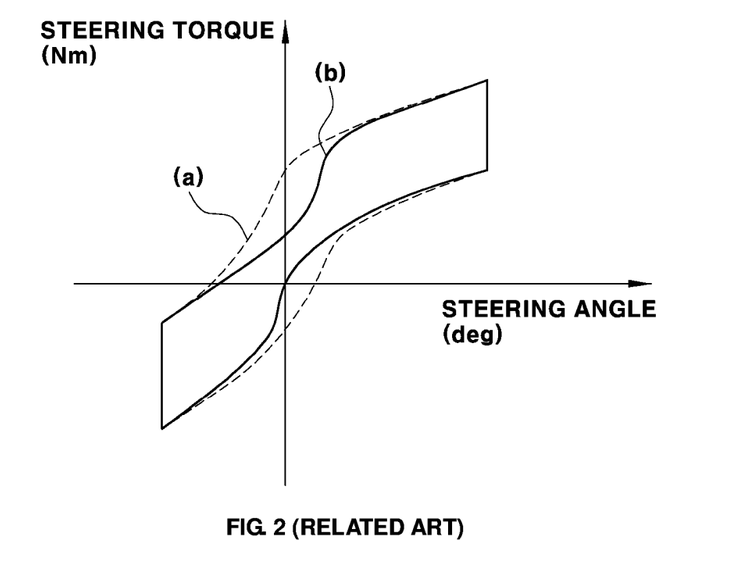
FIG. 2 (RELATED ART) is a hysteresis curve indicating steering torque which is changed due to the occurrence of durability degradation in the motor-driven power steering system.

FIG. 2 (RELATED ART) is another view for explaining a problem in the related art, and illustrates curves indicating a steering angle and steering torque under a particular vehicle speed condition, in which (a) is a hysteresis curve indicating steering torque when the motor-driven power steering system is mounted in the vehicle and begins to initially start, and (b) is a hysteresis curve indicating steering torque which has been changed as the motor-driven power steering system is operated for a predetermined period of time and durability degradation occurs.

In a case in which the durability degradation occurs as illustrated in FIG. 2, the driver feels light and loosened steering feeling (i.e., a steering effort is small) when the driver manipulates the steering wheel, and particularly, the steering effort greatly becomes small at an on-center portion, that is, a neutral position of the steering wheel.

Accordingly, there is a need for control logic that allows the driver to feel initial steering feeling before abrasion or durability degradation of the components occur even though the abrasion or the durability degradation of the components occur.

After assembling the components, a degree of mechanical friction may be changed due to a manufacturing variation at the time of manufacturing the components, and thus, there is also a need for a method of compensating for the change in degree of mechanical friction and allowing the driver to feel a predetermined level of steering feeling.

The above information disclosed in this Background section is only for enhancement of understanding of the background of the invention and therefore it may contain information that does not form the prior art that is already known in this country to a person of ordinary skill in the art.

SUMMARY

The present invention provides an apparatus and a method for controlling a motor-driven power steering system, which are capable of inhibiting a change or variation in steering feeling which may be caused by abrasion and degradation of components in the motor-driven power steering system and a variation of a degree of mechanical friction caused by a manufacturing variation at the time of manufacturing the components, and maintaining a predetermined level of initial steering feeling.

In one aspect, the present invention provides an apparatus for controlling a motor-driven power steering system, the apparatus including: a compensation logic unit which calculates a gradient value indicating a change ratio of steering torque or a change ratio of a rack thrust value with respect to a steering angle at a first time point and a second time point when a steering torque detection value or a rack thrust value at the first time point at which a predetermined first steering angle is detected, and a steering torque detection value or a rack thrust value at the second time point at which a predetermined second steering angle is detected are obtained, and determines and outputs a torque compensation amount by using the calculated gradient value; a motor-driven power steering (MDPS) basic logic unit which calculates a motor control value for steering assistance based on driver steering input information including a steering angle detection value and a driver input torque value, and vehicle state information including a vehicle speed detection value, compensates for a steering torque detection value detected by a torque sensor in accordance with the torque compensation amount determined by the compensation logic unit, and then uses the compensated steering torque detection value as the driver input torque value; and a motor control logic unit which controls an operation of a steering motor in accordance with the motor control value calculated by the MDPS basic logic unit.

In another aspect, the present invention provides a method for controlling a motor-driven power steering system, the method including: saving, by a controller, a steering torque detection value or a rack thrust value at a first time point at which a predetermined first steering angle is detected; obtaining, by the controller, a steering torque detection value or a rack thrust value at a second time point at which a predetermined second steering angle is detected; calculating, by the controller, a gradient value indicating a change ratio of steering torque or a change ratio of a rack thrust value with respect to a steering angle at the first time point and the second time point; determining, by the controller, a torque compensation amount by using the calculated gradient value; obtaining, by the controller, a driver input torque value by compensating for a steering torque detection value detected by a torque sensor in accordance with the torque compensation amount; calculating, by the controller, a motor control value for steering assistance based on driver steering input information including a steering angle detection value and the driver input torque value, and vehicle state information including a vehicle speed detection value; and controlling, by the controller, an operation of a steering motor in accordance with the calculated motor control value.

In another aspect, a non-transitory computer readable medium containing program instructions executed by a processor includes: program instructions that save a steering torque detection value or a rack thrust value at a first time point at which a predetermined first steering angle is detected; program instructions that obtain a steering torque detection value or a rack thrust value at a second time point at which a predetermined second steering angle is detected; program instructions that calculate a gradient value indicating a change ratio of steering torque or a change ratio of a rack thrust value with respect to a steering angle at the first time point and the second time point; program instructions that determine a torque compensation amount by using the calculated gradient value; program instructions that obtain a driver input torque value by compensating for a steering torque detection value detected by a torque sensor in accordance with the torque compensation amount; program instructions that calculate a motor control value for steering assistance based on driver steering input information including a steering angle detection value and the driver input torque value, and vehicle state information including a vehicle speed detection value; and program instructions that control an operation of a steering motor in accordance with the calculated motor control value.

According to the apparatus and the method for controlling a motor-driven power steering system, and the non-transitory computer readable medium according to the present invention, by applying a learning control method which determines the torque compensation amount by comparing a reference value with change ratio average data (learned, accumulated and averaged) of the steering torque (or the rack thrust value) with respect to the steering angle, and compensates for driver input torque in accordance with the determined torque compensation amount, it is possible to effectively inhibit a change in steering feeling which may be caused by abrasion and degradation of components, and maintain initial steering feeling.

Other aspects and preferred embodiments of the invention are discussed infra.

BRIEF DESCRIPTION OF THE DRAWINGS

The above and other features of the present invention will now be described in detail with reference to certain exemplary embodiments thereof illustrated in the accompanying drawings which are given hereinbelow by way of illustration only, and thus are not limitative of the present invention, and wherein.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present invention may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

Hereinafter, exemplary embodiments of the present invention will be described in detail with reference to the accompanying drawings so that those skilled in the art to which the present invention pertains may easily carry out the exemplary embodiments.

The present invention provides an apparatus and a method for controlling a motor-driven power steering system, which are capable of inhibiting a change in steering feeling which may be caused by abrasion and degradation of components in the motor-driven power steering system, and maintaining initial steering feeling.

To this end, the present invention provides a control apparatus and a control method, which obtain data of steering torque detected at a first steering angle and a first time point, and data of steering torque detected at a second steering angle and a second time point as driver steering input information at the first time point at which the predetermined first steering angle is detected and at the second time point at which the predetermined second steering angle is then detected, repeatedly obtain, save and learn data at the respective time points (a first steering angle detection time point and a second steering angle detection time point) at the time of a driver steering wheel manipulation (driver steering input), and calculate a torque compensation amount for a driver input torque value by using the repeatedly obtained learning data.

Here, the steering torque may be substituted by a rack thrust value.

When the torque compensation amount is calculated as described above, a steering torque detection value according to driver input torque detected in real time, that is, driver steering input (steering wheel manipulation) is compensated by using the torque compensation amount, and steering assistance control is carried out by using the compensated torque value as a driver input torque value.

Figure 3:
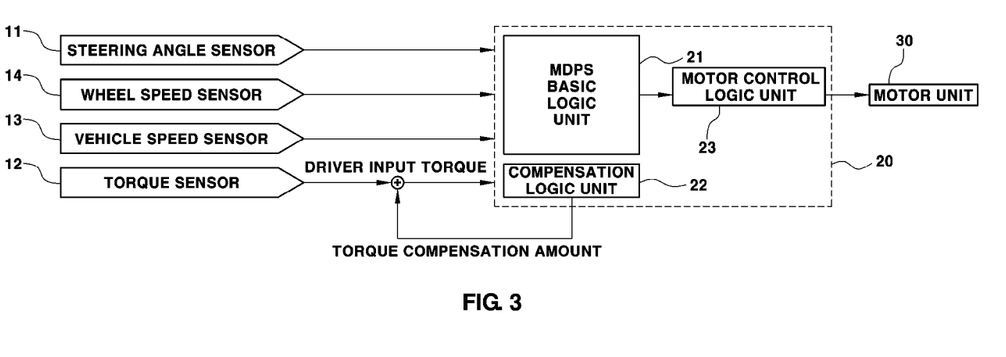
FIG. 3 is a block diagram illustrating a configuration of a motor-driven power steering system according to an exemplary embodiment of the present invention.

FIG. 3 is a block diagram illustrating a configuration of the motor-driven power steering system according to the exemplary embodiment of the present invention.

The motor-driven power steering system according to the exemplary embodiment of the present invention includes at least one sensor which detects steering information, a controller (MDPS ECU) 20, and a motor unit 30 which includes a steering motor (MDPS motor) and an inverter.

Here, the steering information may include at least one of a steering angle (column input angle), steering torque (steering wheel torque and column torque), a steering angular velocity (an angular velocity value obtained from a signal differentiated from a steering angle signal), a vehicle speed, and a wheel speed. To this end, the motor-driven power steering system may include a steering angle sensor 11 which detects a steering angle according to a steering wheel manipulation of a driver (driver steering input), a torque sensor 12 which detects steering torque inputted through the steering wheel, a vehicle speed sensor 13 which detects a vehicle speed, and a wheel speed sensor 14 which detects a wheel speed of each vehicle wheel.

Although not illustrated, additional information may be used so that a vehicle state condition may be taken into account in order to control steering assistance, particularly, control the steering motor in accordance with a driver steering wheel manipulation. For example, information on an engine rotational speed, which is detected by an engine rotational speed sensor, and information on a yaw rate of the vehicle, which is detected by a yaw rate sensor, optionally may be used.

Accordingly, the controller 20 controls a motor electric current for desired motor torque output by using the steering input information such as a steering angle, steering torque, and a steering angular velocity which are obtained by the sensors, and the vehicle state information such as a vehicle speed, a wheel speed, an engine rotational speed, and a yaw rate, in order to drive the steering motor and control output of the steering motor.

In more detail, an MDPS basic logic unit 21 of the controller 20 calculates the motor electric current for outputting the motor torque (steering assistance torque) for assisting a driver steering effort, based on the steering input information such as a steering angle detection value according to the driver steering wheel manipulation, and a steering torque detection value (driver input torque value detected in real time), and the vehicle state information such as a vehicle speed detection value.

In the typical motor-driven power steering system, a motor control logic unit 23 outputs a control signal for controlling the motor electric current by using the motor electric current amount (an auxiliary control electric current amount as a motor control value) calculated by the MDPS basic logic unit 21 as a target value, and the operation of the steering motor is controlled by controlling the motor electric current, which is applied to the steering motor, by the inverter of the motor unit 30 based on the control signal.

However, in the present invention, a compensation logic unit 22 obtains data of steering torque (driver input torque) detected at the first steering angle and the first time point and data of steering torque (driver input torque) detected at the second steering angle and the second time point, as driver steering input information at the first time point at which the predetermined first steering angle is detected and at the second time point at which the second steering angle is then detected while the vehicle travels, repeatedly obtains, saves, and learns the data at the respective time points (the first steering angle detection time point and the second steering angle detection time point) at the time of a driver steering wheel manipulation (driver steering input), and calculates a torque compensation amount by using the repeatedly obtained learning data.

Here, the steering torque may be substituted by a rack thrust value.

That is, the motor-driven power steering system estimates and learns the rack thrust value according to the driver steering wheel manipulation at the first time point and the second time point by using information set for the steering system and information collected in real time while the vehicle travels, and compensates for a driver input torque value (steering torque detection value) by using the first steering angle, the second steering angle, and the learned rack thrust value data.

When the torque compensation amount is calculated as described above, a steering torque detection value according to a driver input torque value detected in real time, that is, driver steering input (steering wheel manipulation) is compensated by using the torque compensation amount, and steering assistance control is carried out by using the compensated torque value as a driver input torque value.

The driver input torque value is steering torque which is applied to the steering wheel when the driver manipulates the steering wheel, and the driver input torque value is detected in real time by the torque sensor 12. In the present invention, the torque compensation amount is calculated by using learning data obtained through a learning process, and then, the driver input torque, which is one of the control variables for steering assistance control, is compensated.

Therefore, the MDPS basic logic unit 21 calculates the motor electric current amount (motor control value) for steering assistance by using the driver input torque value compensated according to the torque compensation amount obtained by the compensation logic unit 22 as a control variable, instead of using the steering torque detection value (driver input torque value) detected by the torque sensor 12 as a driver input torque value, and the motor control logic unit 23 controls the motor electric current applied to the steering motor by the inverter by using the compensated motor electric current amount as a target value.

Meanwhile, in the present invention, a torque build-up state of the steering system will be described with reference to FIG. 4, for reference, prior to explaining a method of calculating the torque compensation amount.

Figure 4:
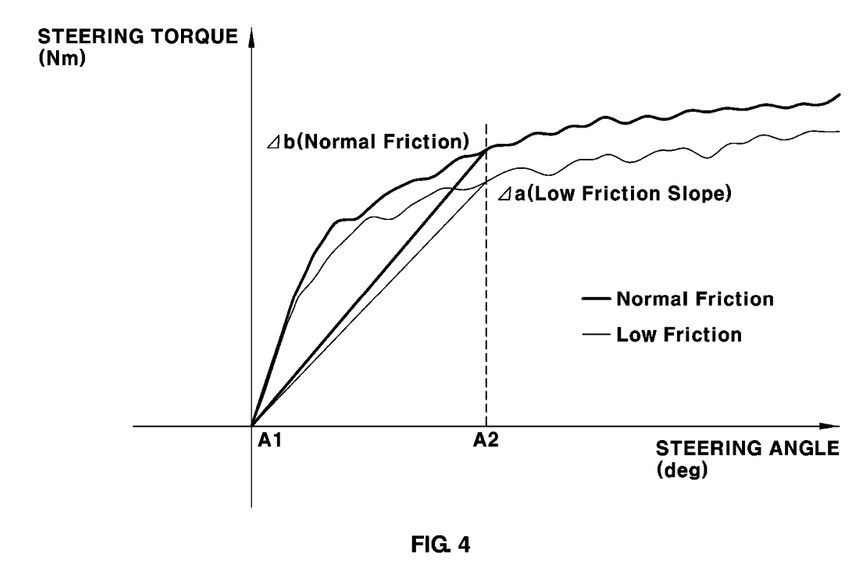
FIG. 4 is a graph illustrating a steering angle and steering torque at the time of driver steering input.

FIG. 4 is a graph illustrating a steering angle and steering torque at the time of driver steering input, and illustrates that the steering torque is increased as the steering angle is increased at an on-center position.

Referring to FIG. 4, it can be seen that when the steering torque is increased up to a particular steering angle and torque is built up, torque build-up changes vary in accordance with a degree of friction.

Therefore, the driver feels different steering effort in accordance with a degree of friction of the steering system which is caused by abrasion and durability degradation of components, and particularly, the driver feels different effort at the time of on-center modified steering.

According to the torque build-up graph in FIG. 4, a gradient of the torque build-up graph is decreased as a degree of friction of the steering system is decreased due to abrasion or durability degradation of components, and when comparing a gradient indicating a change ratio of the steering torque with the steering angle at particular two points (A1→A2), it can be seen that a gradient (Δb, low friction) in the case of low friction in which abrasion or durability degradation occurs is smaller than a gradient (Δa, normal friction) in a case in which a degree of friction is normal (Δb<Δa).

The build-up gradient is a factor that greatly influences on-center steering feeling, and it is necessary to compensate for steering feeling in the light of a gradient value according to a degree of friction.

Accordingly, in the present invention, the torque compensation amount is increased when the build-up gradient value is large, and the torque compensation amount is decreased when the build-up gradient value is small, thereby compensating for the build-up gradient value so that the build-up gradient value becomes the same level as an initially tuned value (target value) gradient, so as to be the same level as a build-up reference for actual initial torque.

FIG. 4 illustrates a relationship between the steering angle and the steering torque, and an aspect similar to the aspect illustrated in FIG. 4 is also implemented even in the case of the steering angle and the rack thrust value. Therefore, the gradient to be described below may indicate a steering torque change ratio with respect to the steering angle detection value at the first time point and the second time point (in the case of steering torque), or may indicate a rack thrust value change ratio with respect to the steering angle detection value at the first time point and the second time point.

Various methods have been known for calculating the rack thrust value of the motor-driven power steering system, and one of the publicly known methods may be used, and a detailed description thereof will be omitted because this method is a technology known in the art.

As an example, the rack thrust value may be calculated based on sensor detection information such as a damping coefficient of the steering system, physical property values including inertia and mass, a motor torque value, and a steering angle detected in real time.

An example for calculating the rack thrust value is also disclosed in Korean Patent Application Laid-Open No. 10-2015-0131783 (Nov. 25, 2015), which is incorporated by reference herein, but the present invention is not limited to the example for calculating the rack thrust value.

Figure 5:
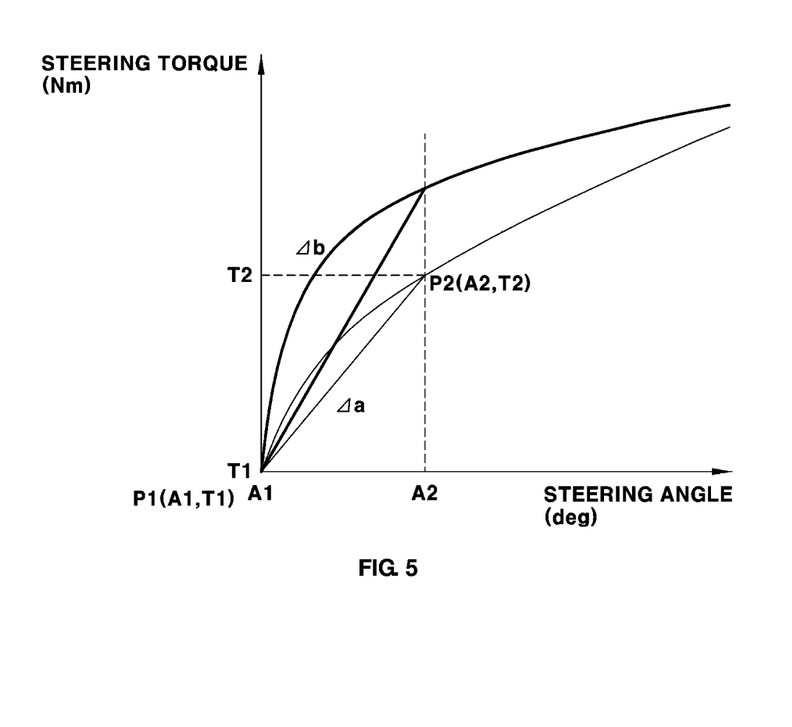
FIG. 5 is a view for explaining that a gradient value is obtained during a process of controlling the motor-driven power steering system according to the present invention.

When calculating the torque compensation amount as described above, the compensation logic unit 22 obtains data of steering torque detection values T1 and T2 or rack thrust values Ft1 and Ft2 at the first time point P1 at which the first steering angle A1 is detected and at the second time point P2 at which the second steering angle A2 is detected, when the predetermined first steering angle (A1 in FIG. 4) is detected first, and then the second steering angle (A2 in FIG. 4) is detected while the vehicle travels, as illustrated in FIG. 5.

Subsequently, each time the torque build-up occurs from the first steering angle to the second steering angle, the data of the steering torque detection values T1 and T2 or the rack thrust values Ft1 and Ft2 are repeatedly obtained and saved.

In addition, each time the data of the steering torque detection values T1 and T2 or the rack thrust values Ft1 and Ft2 are repeatedly obtained and saved, the gradient Δa, which indicates a change ratio of the steering torque or the rack thrust value with respect to the steering angle at the two time points P1 and P2, is repeatedly calculated and saved as learning data.

When the gradients Δa, as the learning data of the predetermined number, are repeatedly calculated as described above, an average value is calculated with respect to the gradient values of the predetermined number N, and the torque compensation amount is calculated by using the gradient average value.

In the present invention, P1 may be a time point when the vehicle travels straight, and the first steering angle may be set to 0 degree that is an angle at the on-center position.

Figure 6:
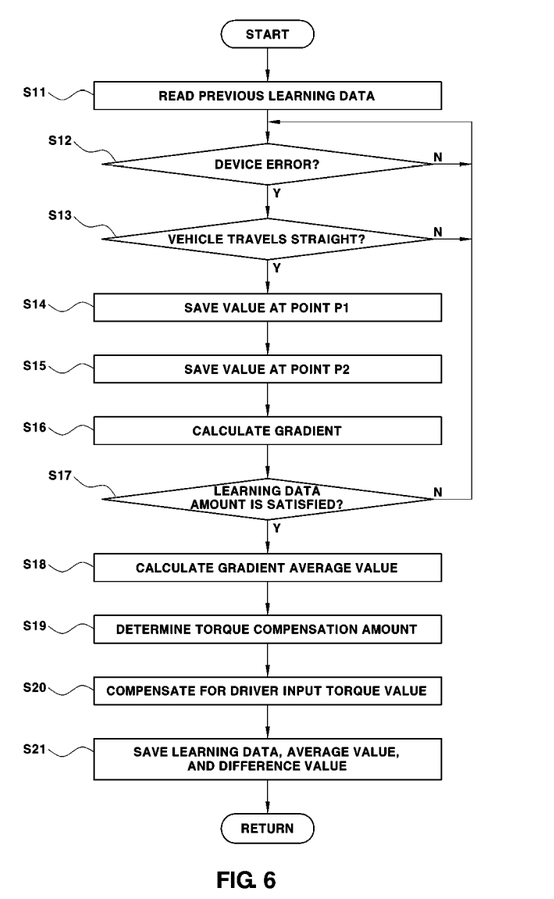
FIG. 6 is a flowchart illustrating a process of controlling the motor-driven power steering system according to the present invention.
Figure 7:
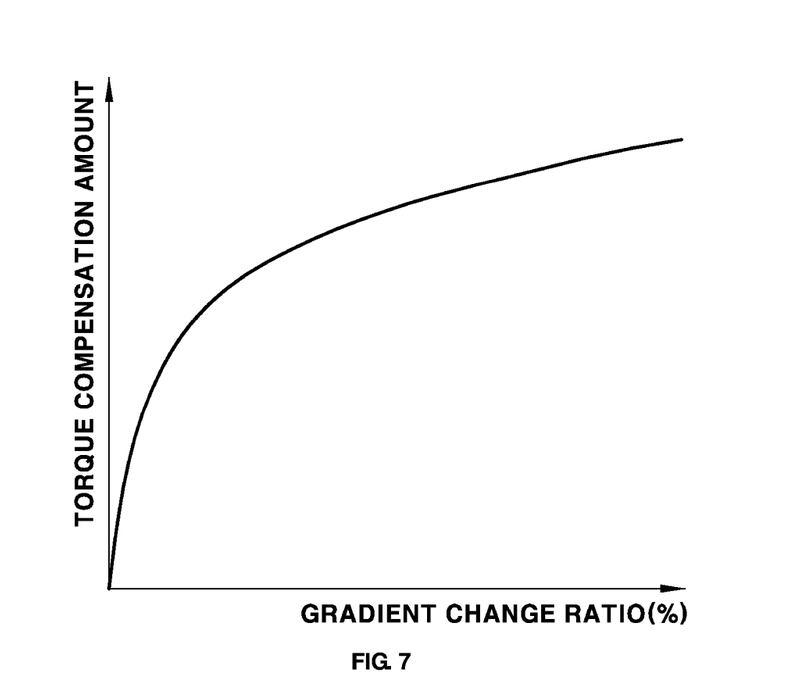
FIG. 7 is a view illustrating an example in which a torque compensation amount is set in accordance with a gradient change ratio in the present invention.

FIG. 6 is a flowchart illustrating a process of controlling the motor-driven power steering system according to the present invention, and FIG. 7 is a view illustrating an example in which the torque compensation amount is set in accordance with a gradient change ratio in the present invention.

First, after IG-ON of the vehicle, the compensation logic unit 22 reads the previously saved learning data, that is, the gradient values of the predetermined number obtained during the learning process when the vehicle travels previously (S11), and reads and uses the data which has been learned before because it is difficult to obtain and save a predetermined amount of data at the initial time and at one time.

Subsequently, whether the sensors, such as the torque sensor 12 or the vehicle speed sensor 13, which detect steering information, break down is checked by predetermined diagnostic logic (S12), and the learning process is carried out only in a case in which the sensors are normal without a failure or a device error.

Whether the vehicle travels straight is determined based on the information collected from the vehicle, that is, the steering input information (steering torque and steering angular velocity) and the vehicle state information (wheel speed) (S13), and the value at the point P1 is saved in a state in which it is determined that the vehicle travels straight (S14).

In this case, the values at the point P1, which is a starting point after it is determined that the vehicle travels straight, are values in a state in which the vehicle travels straight, that is, the steering angle detection value (first steering angle) and the steering torque detection value (or the rack thrust value), and the values at the point P1, which are repeatedly detected during the learning process, may be the same values.

If the first steering angle at the point P1 is 0 degree, the steering torque may be 0 Nm, and the steering torque at the point P2 at which the second steering angle is detected may vary in accordance with a torque build-up state according to a degree of friction.

Subsequently, after it is determined that the vehicle travels straight as described above, and then the value at the point P1 is saved, the value at the point P2 after the torque build-up is saved (S15).

Subsequently, the gradient value Δa is calculated and saved by using the value at the point P1 after it is determined that the vehicle travels straight, and the value at the point P2 after the torque build-up.

Subsequently, each time the process of saving the value at the point P1 after it is determined that the vehicle travels straight and the process of saving the value at the point P2 after the torque build-up are repeated, the gradient value Δa is repeatedly calculated as the learning data through the same method, and then newly calculated gradient values are stored (S16).

The process of determining whether the vehicle travels straight may be set to determine whether the vehicle travels straight based on the steering torque detection value, the wheel speed detection value, and the steering angular velocity, and more particularly, the process may be set to determine that the vehicle travels straight in a case in which a condition in which the steering torque detection value is preset torque or less, a condition in which a wheel speed difference value between a front left wheel and a front right wheel is a preset value or less, and a condition in which the steering angular velocity is a preset angular velocity 1 or less are satisfied.

In a case in which a condition in which the steering torque detection value is a preset torque or more, a condition in which a steering angle change amount is a predetermined angle or more, and a condition in which the steering angular velocity is a preset angular velocity 2 or less are satisfied, data of the steering torque or the rack thrust value is obtained and saved at the point P2 at which the second steering angle is detected.

The condition is a condition for determining whether the torque build-up has been carried out to the extent that the data at the point P2 may be obtained.

Subsequently, whether N learning data amount are satisfied is checked (S17), and after the gradient values Δa of the predetermined number N are obtained and saved, an average value of the gradient values is calculated and saved (S18).

Subsequently, the gradient average value is compared with a predetermined reference gradient value Δb, and the torque compensation amount is determined based on a comparison value (S19).

The torque compensation amount may be newly obtained and renewed by repeating the aforementioned method while the vehicle travels, and when the torque compensation amount is renewed, the renewed torque compensation amount is newly applied, thereby compensating for the driver input torque value in real time.

The preset gradient value is the optimized data which is obtained by preceding tests and research processes, and then preset and saved in the compensation logic unit 22, and the steering torque value (or the rack thrust value) at the first steering angle and the steering torque value (or the rack thrust value) at the second steering angle are obtained as optimized test data through the preceding tests and the research processes, and then the gradient value thereof may be stored and used as the reference gradient value Δb.

When the torque compensation amount is obtained by the compensation logic unit 22 as described above, the driver input torque value, which is inputted to the MDPS basic logic unit 21 at the time of driver steering input (steering wheel manipulation) while the vehicle travels, that is, the steering torque detection value detected by the torque sensor 12 is compensated in real time by using the torque compensation amount (S20).

That is, the value, which is obtained by adding or subtracting the torque compensation amount to or from the driver input torque value detected in real time, is actually used as a control variable for steering assistance in the MDPS basic logic unit 21, and subsequently, the output of the steering motor for steering assistance is controlled by the MDPS basic logic unit 21 and the motor control logic unit 23 by using the compensated torque value as an actual driver input torque value.

When more concretely describing the process of calculating the torque compensation amount using the gradient average value and the reference gradient value Δb, the torque compensation amount may be determined in accordance with a difference value between the gradient average value and the reference gradient value Δb, and particularly, the gradient change ratio with respect to the reference gradient value Δb, that is, the difference value between the reference gradient value Δb and the gradient average value is divided by the reference gradient value Δb, and then a percentage of the difference value with respect to the reference gradient value Δb is obtained, such that the torque compensation amount corresponding to the gradient change ratio (the percentage value) is determined.

In this case, as illustrated in FIG. 7, the compensation value data in which the torque compensation values are determined in accordance with the gradient change ratio value is saved and used in the compensation logic unit 22, and a compensation value corresponding to the calculated gradient change ratio value, that is, the torque compensation amount may be obtained from the compensation value data.

Referring to the compensation value data in FIG. 7, it can be seen that as the gradient change ratio value is increased, the torque compensation amount is set to a larger value.

The compensation value data in FIG. 7 is also the data which is obtained by preceding tests and research processes and saved in advance in the compensation logic unit 22.

As described above, in the present invention, during the learning process, a gradient is calculated by using the values at the points P1 and P2 after the determination of whether the vehicle is driving straight and the torque build-up, and the gradients of the predetermined number are repeatedly obtained through the same method, and then the gradient average value is obtained by accumulating the gradients, and in this case, a method may be applied which sequentially deletes the previous gradient data one by one in the order from the oldest data each time a new gradient is calculated and saved, and calculates the average value by using a predetermined amount of the remaining gradient data.

Alternatively, a method may also be applied which deletes the previous data at once when the gradient values of the predetermined number are calculated and obtained, calculates the gradient average value by using newly obtained gradient values of the predetermined number, and then compensates for torque in real time by using the new gradient average value at the time of driver steering input.

In addition, the data such as finally obtained gradient values of the predetermined number, the average value of the gradient values, and the difference value between the gradient average value and the reference gradient value are saved as the learning data when an engine is turned off (S21).

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. An apparatus for controlling a motor-driven power steering system, the apparatus comprising:
   a compensation logic unit which calculates a gradient value indicating a change ratio of steering torque or a change ratio of a rack thrust value with respect to a steering angle at a first time point and a second time point when a steering torque detection value or a rack thrust value at the first time point at which a predetermined first steering angle is detected, and a steering torque detection value or a rack thrust value at the second time point at which a predetermined second steering angle is detected are obtained, and determines and outputs a torque compensation amount by using the calculated gradient value;

a motor-driven power steering (MDPS) basic logic unit which calculates a motor control value for steering assistance based on driver steering input information including a steering angle detection value and a driver input torque value, and vehicle state information including a vehicle speed detection value, compensates for a steering torque detection value detected by a torque sensor in accordance with the torque compensation amount determined by the compensation logic unit, and then uses the compensated torque value as the driver input torque value; and a motor control logic unit which controls an operation of a steering motor in accordance with the motor control value calculated by the MDPS basic logic unit.

2. The apparatus of claim 1, wherein the compensation logic unit determines whether a vehicle travels straight based on the information collected from the vehicle, and saves the steering torque detection value or the rack thrust value at the first time point together with the first steering angle when the compensation logic unit determines that the vehicle travels straight, so that the steering torque detection value or the rack thrust value at the first time point is used to calculate a gradient value.

3. The apparatus of claim 2, wherein the compensation logic unit determines that the vehicle travels straight when a condition in which the steering torque detection value is a preset torque or less, a condition in which a wheel speed difference value between a front left wheel and a front right wheel is a preset value or less, and a condition in which a steering angular velocity is a preset angular velocity or less are satisfied.

4. The apparatus of claim 1, wherein the compensation logic unit obtains the steering torque detection value or the rack thrust value at the second time point when a condition in which the steering torque detection value is preset torque or more, a condition in which a steering angle change amount is a preset angle or more, and a condition in which a steering angular velocity is a preset angular velocity or less are satisfied, and uses the steering torque detection value or the rack thrust value at the second time point together with the second steering angle when calculating a gradient value.

5. The apparatus of claim 1, wherein the compensation logic unit saves the calculated gradient value, obtains a steering torque detection value or a rack thrust value at the next first time point at which the first steering angle is detected and a steering torque detection value or a rack thrust value at the next second time point at which the second steering angle is detected, and calculates and saves a gradient value through the same method, and subsequently, when the gradient values of the predetermined number are saved by repeating a process of calculating the gradient value using the data at the next first time point and the data at the next second time point, the compensation logic unit determines the torque compensation amount by using a gradient average value that is an average value of the saved gradient values.

6. The apparatus of claim 5, wherein the compensation logic unit is set to determine the torque compensation amount in accordance with a difference value between the gradient average value and a predetermined reference gradient value.

7. The apparatus of claim 6, wherein the compensation logic unit is set to obtain a difference value between the gradient average value and the reference gradient value, obtain a gradient change ratio, which is a percentage value of the difference value with respect to the reference gradient value, and then determine the torque compensation amount corresponding to the obtained gradient change ratio.

8. The apparatus of claim 7, wherein in the compensation logic unit, the torque compensation amount is set to have a larger value as the gradient change ratio is increased.

9. A method for controlling a motor-driven power steering system, the method comprising:

saving, by a controller, a steering torque detection value or a rack thrust value at a first time point at which a predetermined first steering angle is detected;

obtaining, by the controller, a steering torque detection value or a rack thrust value at a second time point at which a predetermined second steering angle is detected;

calculating, by the controller, a gradient value indicating a change ratio of steering torque or a change ratio of a rack thrust value with respect to a steering angle at the first time point and the second time point;

determining, by the controller, a torque compensation amount by using the calculated gradient value;

obtaining, by the controller, a driver input torque value by compensating for a steering torque detection value detected by a torque sensor in accordance with the torque compensation amount;

calculating, by the controller, a motor control value for steering assistance based on driver steering input information including a steering angle detection value and the driver input torque value, and vehicle state information including a vehicle speed detection value; and controlling, by the controller, an operation of a steering motor in accordance with the calculated motor control value.

10. The method of claim 9, wherein whether a vehicle travels straight is determined based on the information collected from the vehicle, and when it is determined that the vehicle travels straight, the steering torque detection value or the rack thrust value at the first time point is saved together with the first steering angle so that the steering torque detection value or the rack thrust value at the first time point is used to calculate a gradient value.

11. The method of claim 10, wherein when a condition in which the steering torque detection value is a preset torque or less, a condition in which a wheel speed difference value between a front left wheel and a front right wheel is a preset value or less, and a condition in which a steering angular velocity is a preset angular velocity 1 or less are satisfied, it is determined that the vehicle travels straight.

12. The method of claim 9, wherein when a condition in which the steering torque detection value is preset torque or more, a condition in which a steering angle change amount is a preset angle or more, and a condition in which a steering angular velocity is a preset angular velocity 2 or less are satisfied, the steering torque detection value or the rack thrust value at the second time point is obtained and used together with the second steering angle to calculate a gradient value.

13. The method of claim 9, wherein the calculated gradient value is saved, a steering torque detection value or a rack thrust value at the next first time point at which the first steering angle is detected and a steering torque detection value or a rack thrust value at the next second time point at which the second steering angle is detected are obtained, a gradient value is calculated and saved through the same method, and subsequently, when gradient values of the predetermined number are saved by repeating a process of calculating the gradient value using the data at the next first time point and the data at the next second time point, the torque compensation amount is determined by using a gradient average value that is an average value of the saved gradient values.

14. The method of claim 13, wherein the torque compensation amount is determined in accordance with a difference value between the gradient average value and a predetermined reference gradient value.

15. The method of claim 14, wherein a difference value between the gradient average value and the reference gradient value is obtained, a gradient change ratio, which is a percentage value of the difference value with respect to the reference gradient value is obtained, and then the torque compensation amount corresponding to the obtained gradient change ratio is determined.

16. The method of claim 15, wherein the torque compensation amount is set to have a larger value as the gradient change ratio is increased.

17. A non-transitory computer readable medium containing program instructions executed by a processor, the computer readable medium comprising:

program instructions that save a steering torque detection value or a rack thrust value at a first time point at which a predetermined first steering angle is detected;

program instructions that obtain a steering torque detection value or a rack thrust value at a second time point at which a predetermined second steering angle is detected;

program instructions that calculate a gradient value indicating a change ratio of steering torque or a change ratio of a rack thrust value with respect to a steering angle at the first time point and the second time point;

program instructions that determine a torque compensation amount by using the calculated gradient value;

program instructions that obtain a driver input torque value by compensating for a steering torque detection value detected by a torque sensor in accordance with the torque compensation amount;

program instructions that calculate a motor control value for steering assistance based on driver steering input information including a steering angle detection value and the driver input torque value, and vehicle state information including a vehicle speed detection value; and program instructions that control an operation of a steering motor in accordance with the calculated motor control value.

* * * * *